United States Patent
Kozko et al.

(10) Patent No.: US 9,357,116 B1
(45) Date of Patent: May 31, 2016

(54) ISOLATING OPPOSING LENSES FROM EACH OTHER FOR AN ASSEMBLY THAT PRODUCES CONCURRENT NON-OVERLAPPING IMAGE CIRCLES ON A COMMON IMAGE SENSOR

(71) Applicant: IC REAL TECH, INC., Pompano Beach, FL (US)

(72) Inventors: Dmitry Kozko, Aventura, FL (US); Ivan Onuchin, Hollywood, FL (US)

(*) Notice: Subject to any disclaimer, the term of this patent is extended or adjusted under 35 U.S.C. 154(b) by 0 days.

(21) Appl. No.: 14/860,832

(22) Filed: Sep. 22, 2015

Related U.S. Application Data

(60) Provisional application No. 62/195,487, filed on Jul. 22, 2015.

(51) Int. Cl.
*H04N 5/225* (2006.01)
*G02B 27/00* (2006.01)
*G02B 13/06* (2006.01)

(52) U.S. Cl.
CPC .............. *H04N 5/2254* (2013.01); *G02B 13/06* (2013.01); *G02B 27/0025* (2013.01)

(58) Field of Classification Search
CPC ... H04N 5/3415; H04N 5/2254; G03B 37/00; G06T 3/4038; G06T 2200/32; G02B 27/0025; G02B 27/0068; G02B 13/06
See application file for complete search history.

(56) References Cited

U.S. PATENT DOCUMENTS

| | | | | |
|---|---|---|---|---|
| 8,730,299 B1* | 5/2014 | Kozko | ................. | H04N 5/2254 348/38 |
| 2005/0062869 A1* | 3/2005 | Zimmermann | ........ | G02B 13/06 348/335 |
| 2005/0253951 A1* | 11/2005 | Fujimoto | ............. | H04N 5/2254 348/335 |
| 2006/0197954 A1* | 9/2006 | Ogura | .................... | G01N 21/05 356/445 |
| 2008/0019684 A1* | 1/2008 | Shyu | ..................... | G03B 17/245 396/332 |
| 2008/0151041 A1* | 6/2008 | Shafer | ................. | A61B 1/00193 348/45 |
| 2008/0266443 A1* | 10/2008 | Lee | ......................... | G02B 15/00 348/344 |
| 2010/0045773 A1* | 2/2010 | Ritchey | .................. | G02B 13/06 348/36 |
| 2011/0315863 A1* | 12/2011 | Yu | ..................... | H01L 31/02325 250/229 |
| 2013/0093858 A1* | 4/2013 | Lee | ....................... | G02B 27/283 348/49 |
| 2014/0055624 A1* | 2/2014 | Gaines | ................. | H04N 5/2254 348/207.1 |
| 2014/0063322 A1* | 3/2014 | Chan | ...................... | G03B 17/17 348/335 |
| 2014/0184821 A1* | 7/2014 | Taneichi | ............ | H04N 21/2743 348/207.1 |

FOREIGN PATENT DOCUMENTS

KR 101268907 * 5/2013

* cited by examiner

*Primary Examiner* — Shahbaz Nazrul
(74) *Attorney, Agent, or Firm* — Patents on Demand P.A.; Brian K. Buchheit; Scott M. Garrett

(57) ABSTRACT

A rectangular image sensor can be present within an optical capture device. Two lenses can capture and direct light from a real world environment upon the image sensor. Two reflectors can each be positioned between one of the two lenses and the sensor to direct light captured by each lens to produce a corresponding image circle on the sensor. The circles can be produced by the two lenses onto the sensor can be non-overlapping in area. A non-reflective separator can be positioned between the optical pathways of light from the two lenses from the time such light is reflected from the two reflectors respectively. The separator can absorb light from a region surrounding the image circle to prevent optical distortions from the image circles which are in close proximity to each other.

18 Claims, 5 Drawing Sheets

ISOLATING OPPOSING LENSES FROM EACH OTHER FOR AN ASSEMBLY THAT PRODUCES CONCURRENT NON-OVERLAPPING IMAGE CIRCLES ON A COMMON IMAGE SENSOR

CROSS-REFERENCE TO RELATED APPLICATION

This application claims the benefit of provisional application No. 62/195,487, filed Jul. 22, 2015 entitled "Isolating Opposing Lenses from Each Other for an Assembly that Produces Concurrent Non-Overlapping Image Circles on a Common Image Sensor". Provisional application No. 62/195,487 is incorporated herein in its entirety.

BACKGROUND

The present invention relates to the field of multi-lens optical capture devices and, more particularly, to isolating opposing lenses from each other for an assembly that produces concurrent non-overlapping image circles on a common image sensor.

Commercial image sensors are generally rectangular shaped due to fabrication techniques and constraints. During fabrication a relatively large rectangular surface is formed, which is subdivided into smaller rectangular geometries, each of which become an image sensor. Conventionally, a rectangular or square sensor is used as a light target for a circular (or oval) image circle from a lens. As such, there is an incongruity between the image circle from the lens (e.g., light striking image sensor) and the geometry of the sensor (e.g., rectangular). Consequently, maximizing image sensor usage has been a significant effort within the industry.

BRIEF SUMMARY

One aspect of the present invention can include an optical device for isolating opposing lenses from each other for an assembly that produces concurrent non-overlapping image circles on a common image sensor. A rectangular image sensor can be present within an optical capture device. Two lenses can capture and direct light from a real world environment upon the image sensor. Two reflectors can each be positioned between one of the two lenses and the sensor to direct light captured by each lens to produce a corresponding image circle on the sensor. The circles can be produced by the two lenses onto the sensor can be non-overlapping in area. A non-reflective separator can be positioned between the optical pathways of light from the two lenses from the time such light is reflected from the two reflectors respectively. The separator can absorb light from a region surrounding the image circle to prevent optical distortions from the image circles which are in close proximity to each other.

Another aspect of the present invention can include a method for isolating opposing lenses from each other for an assembly that produces concurrent non-overlapping image circles on a common image sensor. An input to adjust at a position and angle of a set of lenses within an optical capture device can be received, wherein the optical capture devices includes a rectangular image sensor, two lenses that capture and direct visible light from a real world environment upon the image sensor. The image sensor can be a device which converts visible light within a real world environment into electronic signals. Two reflectors can each positioned between one of the two lenses and the rectangular image sensor to direct light captured by each lens to produce a corresponding image circle on the rectangular image sensor. The image circles produced by the two lenses onto the rectangular image sensor can be non-overlapping in area. A non-reflective separator can be positioned between the optical pathways of light from the two lenses from the time such light is reflected from the two reflectors respectively. The separator can absorb light from a region surrounding the image circle to prevent optical distortions from the image circles which are in close proximity to each other. A corresponding position and angle of the reflectors and the image sensor can be adjusted responsive to an adjustment of the two lenses position or angle such that the optical pathways are retained and the image circles are captured without substantial distortion.

Yet another aspect of the present invention can include a system for isolating opposing lenses from each other for an assembly that produces concurrent non-overlapping image circles on a common image sensor. An adjuster mechanism can include an electromechanical component able to reposition two lenses within an optical capture device that capture and direct visible light from a real world environment upon the image sensor adjust a reflector and a set of lenses. A rectangular image sensor can be present within the optical capture device. Two reflectors can each positioned between one of the two lenses and the rectangular image sensor to direct the visible light captured by each lens to produce a corresponding image circle on the rectangular image sensor. The image circles produced by the two lenses onto the rectangular image sensor can be non-overlapping in area. A non-reflective separator can be positioned between the optical pathways of light from the two lenses from the time such light is reflected from the two reflectors respectively. The separator can absorb light from a region surrounding the image circle to prevent optical distortions from the image circles which are in close proximity to each other.

DETAILED DESCRIPTION

Figure 1A:
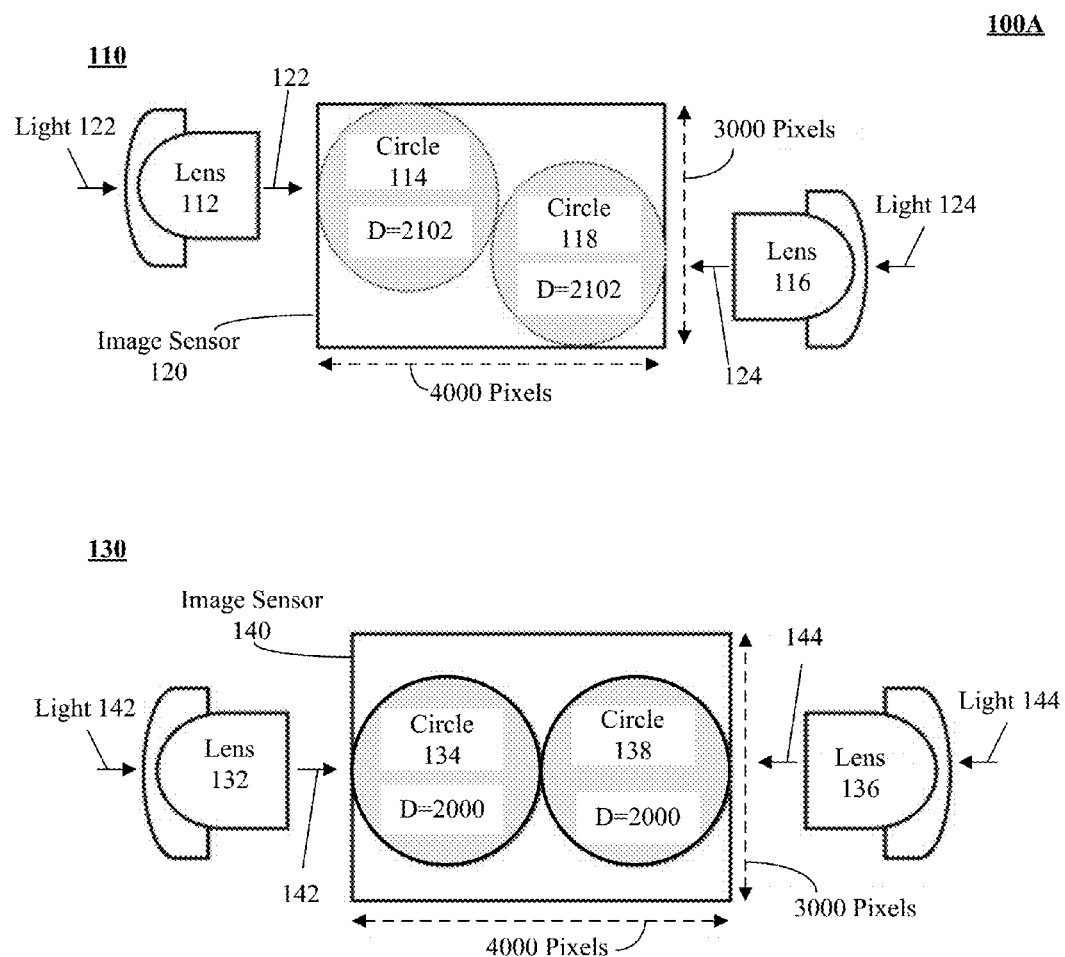
FIG. 1A is a schematic diagram illustrating a set of embodiments for isolating opposing lenses from each other for an assembly that produces concurrent non-overlapping image circles on a common image sensor in accordance with an embodiment of the inventive arrangements disclosed herein

The present disclosure is a solution for isolating opposing lenses from each other for an assembly that produces concurrent non-overlapping image circles on a common image sensor. In the solution, a set of reflectors can be utilized to permit an adjustable configuration for a set of lenses within an optical capture device. In one embodiment, the reflectors can reflect light collected by lenses onto a singular image sensor. In the embodiment, a non-reflecting non-transparent separator can be positioned parallel to the reflected light plane to occlude penumbral glow produced by the reflected light striking the singular image sensor.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A is a schematic diagram illustrating a set of embodiments 110, 130 for isolating opposing lenses from each other for an assembly that produces concurrent non-overlapping image circles on a common image sensor in accordance with an embodiment of the inventive arrangements disclosed herein. Embodiments 110, 130 can be performed in the context of embodiments 150, 170, 210, 230, 250, 270, 310, and/or system 350.

An image sensor 120 (e.g., imaging sensor) is a sensor that detects and conveys the information that constitutes an image. The sensor 120 can convert the variable attenuation of waves (e.g., as they pass through or reflect off objects) into signals, the small bursts of current that convey the information. The waves can be light 122, 124 or other electromagnetic radiation. Digital image sensors can include semiconductor charge-coupled devices (CCD) or active pixel sensors in complementary metal-oxide-semiconductor (CMOS) or N-type metal-oxide-semiconductor (NMOS, Live MOS) technologies.

Embodiment 110, 130 utilizes a single image sensor 120, 140 (e.g., rectangular in shape) for two different lenses (e.g., 112, 116 for embodiment 110 and 132, 136 for embodiment 130). These lenses 112, 116, 132, 136 can face opposing directions (e.g., or otherwise contain image data that is non-overlapping). The areas of the image sensor upon which an image circle 114, 118, 134, 138 can be formed from the light 122, 124 from each of the two lenses 112, 116, 132, 136 is non-overlapping, as well. For example, two images 114, 118 can be formed on a single image sensor 120 from two different opposing lenses 112, 116 of a multi-lens camera.

One challenge faced with the embodiment 110, 130 is to make the image circles 114, 118, 134, 138 as close as possible to each other (e.g., to maximize effective space of an image sensor being used), while ensuring that the image circles 114, 118, 134, 138 are non-overlapping.

Figure 1B:
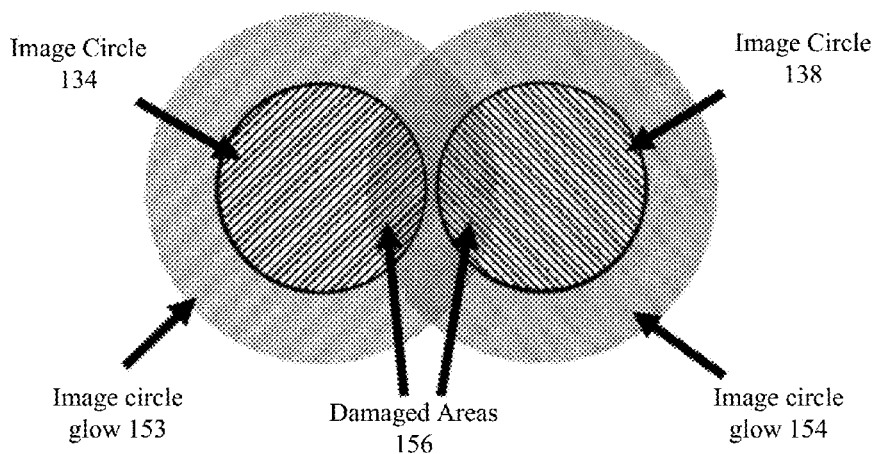
FIG. 1B is a schematic diagram illustrating a set of embodiments for isolating opposing lenses from each other for an assembly that produces concurrent non-overlapping image circles on a common image sensor in accordance with an embodiment of the inventive arrangements disclosed herein.

FIG. 1B is a schematic diagram illustrating a set of embodiments 150, 170 for isolating opposing lenses from each other for an assembly that produces concurrent non-overlapping image circles on a common image sensor in accordance with an embodiment of the inventive arrangements disclosed herein. Embodiments 150, 170 can be performed in the context of embodiments 110, 130, 210, 230, 250, 270, 310, and/or system 350.

Embodiment 150 illustrate penumbral 'glow' associated with image circle 134, 138 as a result of image capture. That is, while image circles 134, 138 are discrete, the circles 134, 136 light from lens 142, 144 is not completely occluded, thus a penumbral shadow 153, 154 is formed. That is, image circle 134, 138 have a glow as a result of optical scatter around an image circle. When the image circles are positioned close to each other, the glow 153 of circle 134 can overlap the area of the other's image circle 138 and vice versa. This results in an optical interference that is visually shown in embodiment 150. The region of interference is listed as damaged areas 156 as the optical content is distorted within this region.

To prevent damaged areas 156 the image circles can be isolated from each other to minimize the distractive interference resulting from the respective glow about the image circles. A simplistic example of this is shown in embodiment 170. In embodiment 170, the region that would be close to the overlap, utilizes a non-reflective separator 177 to absorb the 'glow'. Thus, the light 180, 182 from the two lenses 171, 172 striking the image sensor 178 surface lacks the glow (or has been minimized) to ensure that an area of the image circle 173, 174 is not corrupted by the glow of the neighboring image circle.

In one instance, a housing (e.g., arrangement of lenses suitable for a device) that permits different lenses to be utilized in a common housing is disclosed. In other words, typically a form factor and basic components are established for an optical device, where different lenses are expected to be utilized over time for different models. The precision of the lenses relative to the sensor (given the glow effect and the optical path) are extremely sensitive in the above contemplated arrangement (e.g., embodiment 170). It is beneficial to have an arrangement were a size and shape of a camera module is able to be adjusted without significant redesign efforts of the overall optical system.

Figure 2A:
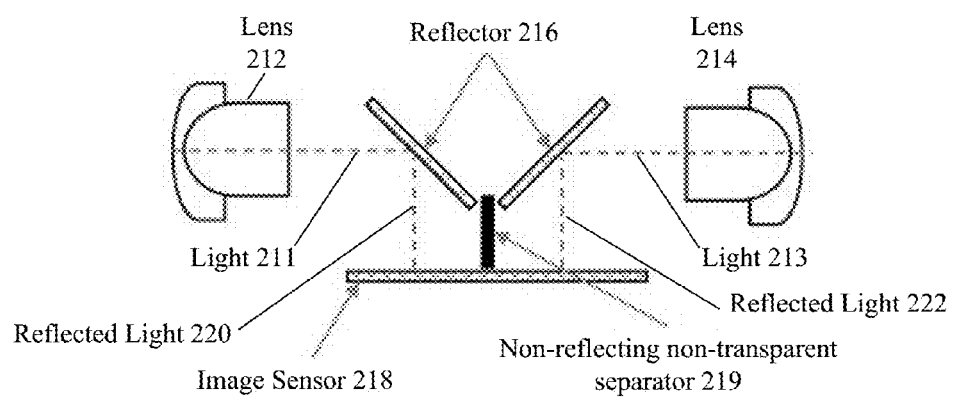
FIG. 2A is a schematic diagram illustrating a set of embodiments for isolating opposing lenses from each other for an assembly that produces concurrent non-overlapping image circles on a common image sensor in accordance with an embodiment of the inventive arrangements disclosed herein.
Figure 2A:
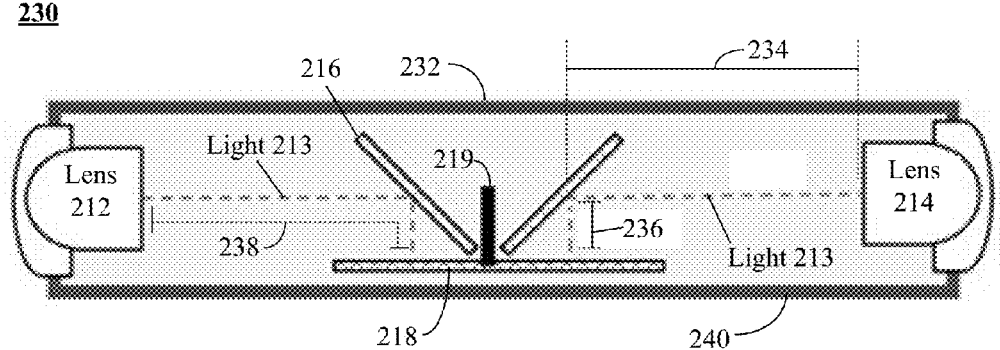

FIG. 2A is a schematic diagram illustrating a set of embodiments 210, 230 for isolating opposing lenses from each other for an assembly that produces concurrent non-overlapping image circles on a common image sensor in accordance with an embodiment of the inventive arrangements disclosed herein. Embodiments 210, 230 can be performed in the context of embodiments 110, 130, 150, 170, 250, 270, 310, and/or system 350.

The embodiments 210, 230 can utilize a lens arrangement with opposing lenses, each directing their captured optics to a reflector (e.g., reflector 216). The reflector 216 can establish an angle to direct light to the image sensor. The reflected light 220, 222 is isolated (from the reflector onward by a non-reflective non-transparent separator 219 (e.g., a blinder to ensure optical interfere between image circles is minimized). This is shown in embodiment 210.

In embodiment 230, 250, 270, the arrangement can permit the overall reflector position, separator element, and image sensor to be fixed for a variety of lenses. The lenses can be repositioned along their optical center to be closer or further away from the reflector (depending on optical characteristics). It should be appreciated that separator 219 shape, thickness, attenuation coefficient can vary between embodiments, permitting the function of the separator is within acceptable tolerances.

One key consideration for the embodiments of the disclosure is that optical parameters of the image circle are not changed after being reflected by the reflector. That is, that the reflector can be placed at any distance from the image where the total distance 238 from the lens to the image sensor remains the same, even though significant adjustment (e.g., lengths 234, 236) are possible for form-factor/design purposes. For example, the focal length of lenses 212, 214 can be arbitrarily divided into two segments of varying length whose sum can be approximately equal to the focal length of the lenses 212, 214.

Embodiments 230, 250, 270 illustrate three different such arrangements, where the optical properties (e.g., length from lens to image sensor) are stable and effectively unchanged. Thus, many different physical arrangements are possible, yet the functional (e.g., electronic features/optical functions) are stable/unchanged. In other words, the image circle striking the image sensor is substantially the same regardless of which of the above physical arrangements are used.

In embodiment 230, lenses 212, 214 can be arranged along a horizontal or vertical plane to maximize the distance 234 between lens 212, 214 and reflectors 216 and minimize the distance 236 between the reflectors 216 and sensor 218. For example, the housing 232 of a multi-lens camera of embodiment 230 can be a horizontal cylindrical tube with lens 212, 214 at each end and image sensor 218 in the middle. In the embodiment, separator 219 can be placed between reflectors 216 to block light emanating from the edges of image circles on sensor 218.

Figure 2B:
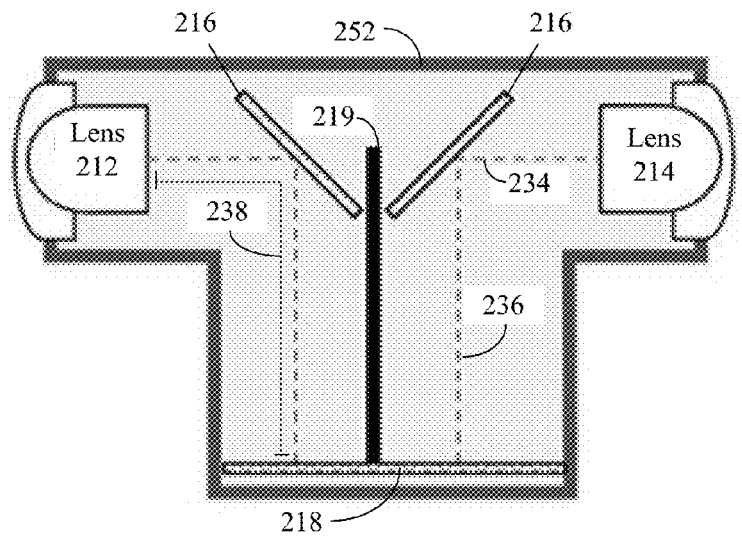
FIG. 2B is a schematic diagram illustrating a set of embodiments for isolating opposing lenses from each other for an assembly that produces concurrent non-overlapping image circles on a common image sensor in accordance with an embodiment of the inventive arrangements disclosed herein.
Figure 2B:
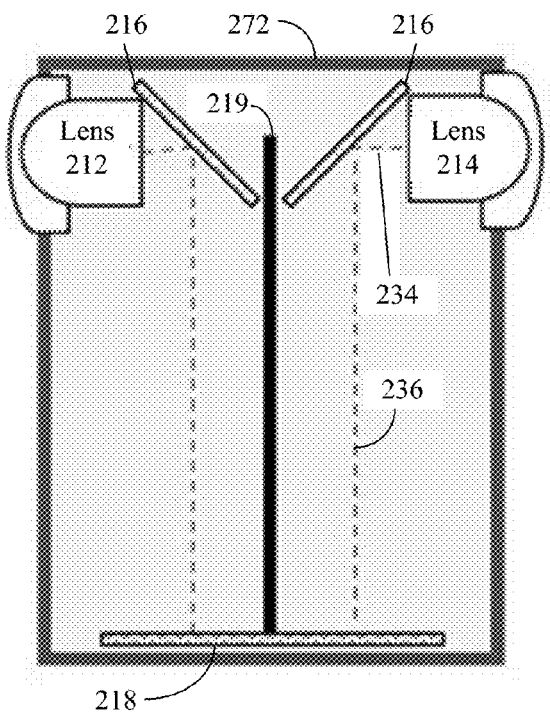

FIG. 2B is a schematic diagram illustrating a set of embodiments 250, 270 for isolating opposing lenses from each other for an assembly that produces concurrent non-overlapping image circles on a common image sensor in accordance with an embodiment of the inventive arrangements disclosed herein. Embodiments 210, 230 can be performed in the context of embodiments 110, 130, 150, 170, 210, 230, 310, and/or system 350.

In embodiment 250, lenses 212, 214 and sensor 218 can be arranged in a within a three way junction shaped housing 252. In the embodiment 250, distance 234, 236 can be approximately equivalent. For example, the housing 252 of a multi-lens camera of embodiment 250 can be a vertical "T" shape with lens 212, 214 at the branch ends and image sensor 218 at the base. That is, lens 214, 216 and sensor 218 can be equidistant from reflector 216. In the embodiment, separator 219 can be placed between reflectors 216 to block light emanating from the edges of image circles on sensor 218.

In embodiment 270, lenses 212, 214 and sensor 218 can be arranged in a within a vertical rectangular solid shaped housing 272. In the embodiment 270, distance 236 can be approximately substantially larger than distance 234. For example, the housing 272 of a multi-lens camera of embodiment 270 can be a rectangular shape with lens 212, 214 at the top and image sensor 218 at the base. That is, lens 214, 216 can be proximate (e.g., distance 234) to reflector 216 and sensor 218 can the remaining distance of the focal length from reflector 216. In the embodiment, separator 219 can be placed between reflectors 216 to block light emanating from the edges of image circles on sensor 218.

The embodiments 230, 250, 270 are illustrative where other arrangements are contemplated to achieve the same net result. For example, a relative position of lenses/reflectors and/or image sensor can be adjustable relative to each other within a given assembly, as shown in embodiment 310.

Figure 3:
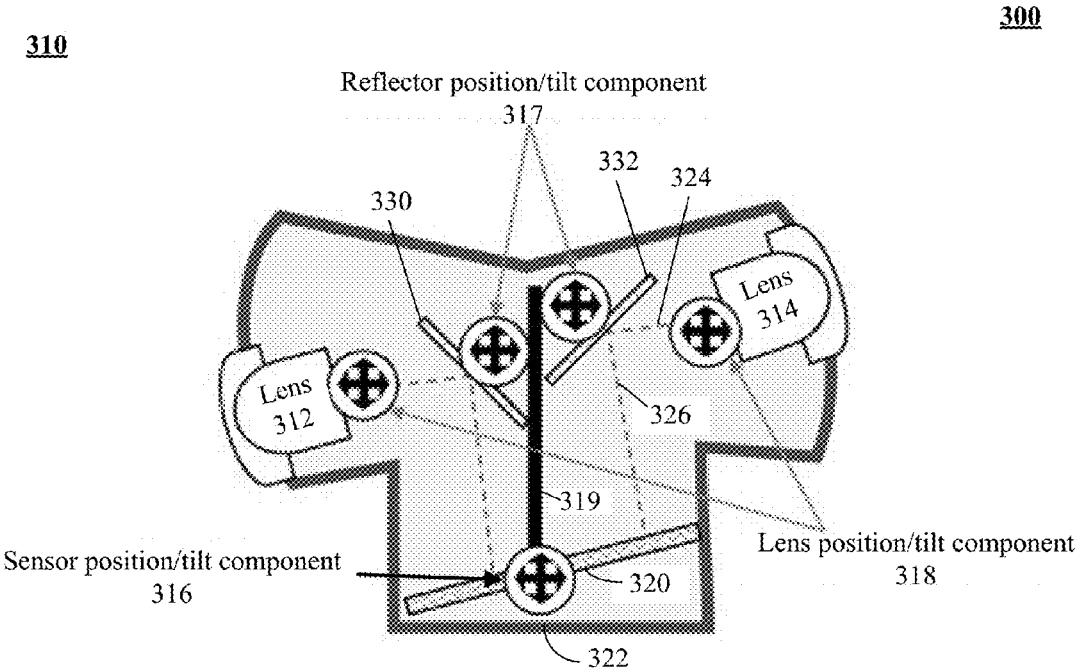
FIG. 3 is a schematic diagram illustrating an embodiment and a system for isolating opposing lenses from each other for an assembly that produces concurrent non-overlapping image circles on a common image sensor in accordance with an embodiment of the inventive arrangements disclosed herein.
Figure 3:
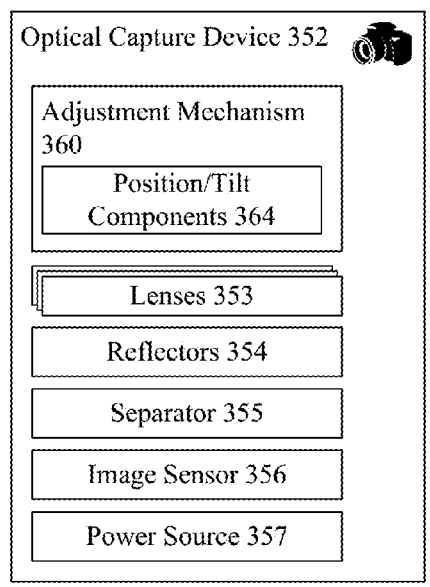

FIG. 3 is a schematic diagram illustrating an embodiment 310 and a system 350 for isolating opposing lenses from each other for an assembly that produces concurrent non-overlapping image circles on a common image sensor in accordance with an embodiment of the inventive arrangements disclosed herein. Embodiments 210, 230 can be performed in the context of embodiments 110, 130, 150, 170, 210, 230, 250, and/or 270.

Embodiment 310 and derivatives thereof permit significant adjustments of the components relative to each other, with minor changes to the overarching design. This can be significant when different lenses (e.g., wide angle, telephoto) are used in different models of a device, which change the overall optics (e.g., affecting the image circle that strikes the common image sensor). The embodiment 310 permits numerous optimizing adjustments. These adjustments can also be significant to optimize optical arrangements in situations where calibration of end-device 322 specifics are needed. For example, a manufacturing or fabrication process can include significant tolerance ranges that could affect the optical properties such that discrete adjustments to account for these anticipated deltas can be optimized for without negatively affecting device performance.

In embodiment 310, components 316, 317, 318 can permit lens 312, 314, reflector 330, 332, and/or image sensor 322 to be suitably adjusted for a wide range of optical device applications. That is, distance 324, 326 can be modified with minimal effort for a variety of device types (e.g., fixed lens devices, telephoto lens devices).

In one embodiment, component 316 can permit lens 312, 314 to move within a three dimensional plane without affecting image capture. In the embodiment, lens 312, 314 can be determined (e.g., via accelerometer) and an appropriate corresponding position for reflector 330, 332 and image sensor 320 can be established to enable image capture to be performed. In one instance, components 316, 317, 318 can function prior to, during, and/or after image capture to enable a range of field of view greater than that of lens 312, 314. For example, lens position/tilt component 318 can allow the lens 312 or lens 314 to move within a 30 degree vertical arc.

In one instance, component 317 can permit reflectors 330, 332 to move within a corresponding three dimensional plane without affecting image capture. That is, the reflectors 330, 332 can maintain an established optical pathway without interruption. In the embodiment, reflector 330, 332 angle and/or position can be adjusted based on lens 312, 314 movement. For example, reflector 332 angle can be decreased a suitable amount (e.g., along a horizontal plane) when the lens 314 moves vertically.

In one embodiment, component 316 can permit image sensor 320 to move within a corresponding three dimensional plane without affecting image capture. That is, the sensor 320 can receive light from an established optical pathway without interruption. In the embodiment, sensor 320 angle and/or position can be adjusted based on lens 312, 314 movement. For example, sensor 320 can be tilted counterclockwise when lens 314 is adjusted upwards.

It should be appreciated that components 312, 314, 320, 330, 332 can operate in unison to enable the functionality described herein. That is, components 312, 314, 320, 330, 332 can be tightly integrated enabling discrete orchestrated adjustments of the components 312, 314, 320, 330, 332.

In system 350, an optical capture device 352 can include an adjustment mechanism 360 which can facilitate various lens-reflector-sensor arrangements for the disclosure. In one instance, optical capture device 352 can be a 360 degree camera with two or more lenses (e.g., fish eye, wide angle, ultra wide angle). In the instance, lens 312, 314 can move within a panoramic arc to capture a panoramic view of a real world environment. System 350 can include, but is not limited to, an adjustment mechanism 360, lenses 353, reflectors 354, a separator 355, an image sensor 356, power source 357, a data store, a transceiver, and the like. Device 352 can include characteristics such as aperture, focal length, depth of field, and the like. In one embodiment, device 352 can include a set of a fixed surround imaging components for capturing a field of view of between two hundred and seventy to three hundred and sixty degrees of a horizontal plane. For example, device 352 can include two diametrically opposing wide angle or ultra-wide angle lenses able to capture a field of view (FOV) of greater than 180 degrees. It should be appreciated that device 352 can include, but is not limited to, a pan capability, a tilt functionality, a zoom capability, and the like. In one embodiment, device 352 can include wired capabilities, wireless functionality, and the like.

In one instance, device 352 can include, but is not limited to, thermal imaging, infrared capabilities, low light functionality, and the like. In one embodiment, device 352 can include an array of lenses able to capture a high definition view of a real world environment. It should be appreciated that device 352 resolution can meet or exceed Standard Definition (SD), High Definition (HD), Quad HD/4K (QHD), and the like.

Adjustment mechanism 360 can be a hardware/software entity for controlling position/tilt components 364. Mechanism 360 can include, but is not limited to, position/tilt components 364, settings, control logic (e.g., software/firmware), and the like. Position/tilt components 364 can include electromechanical components, electromagnetic components, and the like. For example, components 364 can include actuator motors, an accelerometer, and a control logic which can dynamically adjust lenses 353, reflectors 354, and/or image sensor responsive to a user command. It should be appreciated that components 364 can correspond to components 316, 317, 318 of embodiment 310.

In one instance, adjustment mechanism 360 can respond to camera operations including, but not limited to, pan, zoom, tilt, and the like. In one embodiment, mechanism 360 can include a gyroscopically stabilized framework which can be automatically triggered responsive to a manual camera position change. For example, when a user tilts the camera downwards, the lenses can move upward and the reflectors and sensor can be correspondingly adjusted.

It should be appreciated that mechanism 360 can allow for arbitrary lens 353 placement which can permit assembly (e.g., housing) and consequently geometry of optical to be arbitrary. Contemplated embodiments include regular and irregular shapes including, but not limited to, spherical shapes, pyramidal shapes, hexagonal prism, octahedral shapes, cylindrical shapes, cuboidal shapes, dodecahedral shapes, and the like.

Lenses 353 can be a transmissive optical device that affects the focus of a light beam through refraction. Lenses 353 can include simple lenses, compound lenses, a lens array (e.g., lens stack), and the like. Lenses 353 can include, but is not limited to, biconvex, planoconvex, planoconcave, biconcave, positive meniscus, negative meniscus, and the like.

Reflectors 354 can be one or more light reflective devices for transmitting light from lense 312, 314 to sensor 320. In one embodiment, reflectors 354 can be a plane mirror. Reflectors 354 can include, but is not limited to silver glass mirrors, dielectric coated minor, and the like. In one instance, reflectors 354 geometry can conform to approximately half of the image sensor size 320 to permit correspondingly sized image circles to be formed on the rectangular (or square) image sensor.

Separator 355 can be a physical element for absorbing light within camera 352. Separator 355 geometry can include, but is not limited to, a rectangle, a square, a trapezoid, and the like. It should be appreciated that separator 355 size (e.g., width, height, thickness) can conform to any arbitrary dimension. In one instance, separator 355 width can conform to the image sensor 322 width and height can be approximately equivalent to the sensor-reflector distance (e.g., distance 326). In one embodiment, separator 355 can be made of specialized materials such as VANTABLACK (e.g., "super" black material) with extremely high light absorption capabilities. In another embodiment, separator 355 can be covered in a light absorbing coating (e.g., light absorbing paint, light absorbing textures).

Image sensor 356 can be a hardware/software element for converting an optical image into an electronic signal. Sensor 356 semiconductor charge-coupled devices (CCD), active pixel sensors in complementary metal-oxide-semiconductor (CMOS), N-type metal-oxide-semiconductor (NMOS, Live MOS) technologies, and the like. Sensor size and/or resolution can conform to traditional and/or proprietary form factors and/or resolutions. For example, sensor 356 can be a 1/3.2" rectangular sensor with a height of 4.54 millimeters and a width of 3.39 millimeters.

Power source 357 can be a hardware/software electrical and/or electro-chemical entity able to provide electricity to device 352, device 352 components, adjustment mechanism 360, position/tilt components 364, and the like. Power source 357 can include, but is not limited to, a battery, an electrical power source, and the like. In one instance, power source 357 can provide electrical energy to adjustment mechanism 360 to perform the functionality described herein.

Drawings presented herein are for illustrative purposes only and should not be construed to limit the invention in any regard. It should be appreciated that the disclosure can utilize the Lensmaker's equation to establish an initial or dynamic position lenses 312, 314, sensor 320, reflectors 330, 332, and the like. In one embodiment, mechanism 360 can be mechanical enabling a user to manually adjust lens 312, 314 which can trigger appropriate adjustment of reflectors 330, 332 and/or sensor 320.

Figure 1B:
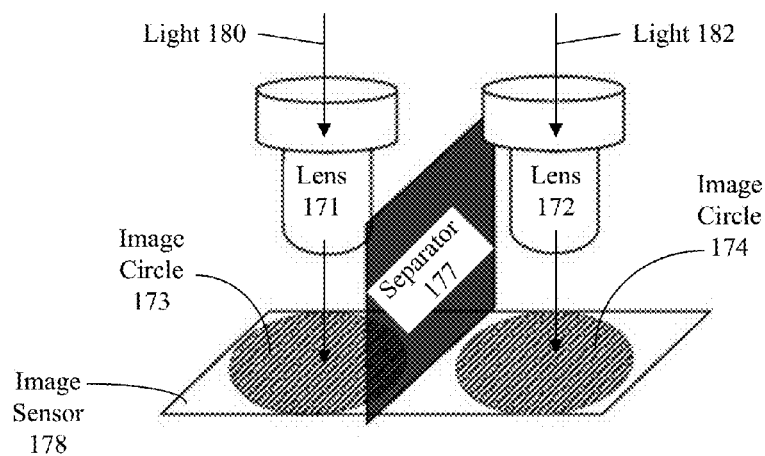

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A digital optical device comprising:
    a rectangular image sensor within an optical capture device;
    two lens that capture and direct light from a real world environment upon the image sensor, wherein the image sensor is a device which converts the light from the real world environment into electronic signals;
    two reflectors, each positioned between one of the two lenses and the rectangular image sensor to direct light captured by each lens to produce a corresponding image circle on the rectangular image sensor, wherein the image circles produced by the two lenses onto the rectangular image sensor is non-overlapping in area; and
    a non-reflective separator positioned between the optical pathways of light from the two lenses from the time such light is reflected from the two reflectors respectively, wherein the separator absorbs light from a region surrounding the image circle to prevent optical distortions from the image circles which are in close proximity to each other wherein a focal point of the image circles is within 5 percent of a diagonal line between opposing corners of the image sensor, wherein the outer perimeter of each image circle is within 5 percent of two different edges of the image sensor.

2. The optical device of claim 1, wherein the rectangular image sensor is a square image sensor.

3. The optical device of claim 1, wherein each of the image circles is an ellipse shape.

4. The optical device of claim 1, wherein each of the image circles is a circular shape.

5. The optical device of claim 1, wherein the focal point of each image circle is within 2 percent of the two different edges of the image sensor.

6. The optical device of claim 1, wherein the lenses share an optical axis relative to the image sensor, wherein the image sensor is placed between 40 and 50 degrees of this optical axis to align the diagonal of the rectangular shape along the optical axis.

7. The optical device of claim 1, wherein when the lenses position or angle are adjusted, the image sensor and reflectors are correspondingly adjusted to continually maintain the optical pathways.

8. The optical device of claim 1, wherein the separator is a non-reflective non-transparent separator configured to absorb light fall off from the optical pathways of light striking the image sensor.

9. A method for adjusting a multi-lens optical capture device comprising:
    receiving an input to adjust at least one a position and angle of a set of lenses within an optical capture device, wherein the optical capture devices comprises of at least one of a rectangular image sensor, two lenses that capture and direct visible light from a real world environment upon the image sensor, wherein the image sensor is a device which converts visible light within a real world environment into electronic signals, two reflectors, each positioned between one of the two lenses and the rectangular image sensor to direct light captured by each lens to produce a corresponding image circle on the rectangular image sensor, wherein the image circles produced by the two lenses onto the rectangular image sensor is non-overlapping in area, and a non-reflective separator positioned between the optical pathways of light from the two lenses from the time such light is reflected from the two reflectors respectively, wherein the separator absorbs light from a region surrounding the image circle to prevent optical distortions from the image circles which are in close proximity to each other; and adjusting at least one of a corresponding position and angle of the reflectors and the image sensor responsive to an adjustment of the two lenses position or angle such that the optical pathways are retained and the image circles are captured without substantial distortion, wherein a focal point of the image circles is within 5 percent of a diagonal line between opposing corners of the image sensor, wherein the outer perimeter of each image circle is within 5 percent of two different edges of the image sensor.

10. The method of claim 9, wherein the adjusting is performed during an image capture functionality of the optical capture device.

11. The method of claim 9, wherein the rectangular image sensor of the optical capture device is a square image sensor.

12. The method of claim 9, wherein each of the image circles is an ellipse shape.

13. The method of claim 9, wherein each of the image circles is a circular shape.

14. The method of claim 9, wherein the focal point of each image circle is within 2 percent of the two different edges of the image sensor.

15. The method of claim 9, wherein the lenses share an optical axis relative to the image sensor, wherein the image sensor is placed between 40 and 50 degrees of this optical axis to align the diagonal of the rectangular shape along the optical axis.

16. The method of claim 9, wherein when the lenses position or angle are adjusted, the image sensor and reflectors are correspondingly adjusted to continually maintain the optical pathways.

17. The method of claim 9, wherein the separator is a non-reflective non-transparent separator configured to absorb light fall off from the optical pathways of light striking the image sensor.

18. A system for an adjuster for an optical capture device comprising:

an adjuster mechanism comprising of electromechanical components able to reposition two lenses within an optical capture device that capture and direct visible light from a real world environment upon the image sensor adjust a reflector and a set of lenses, a rectangular image sensor within the optical capture device and two reflectors, each positioned between one of the two lenses and the rectangular image sensor to direct the visible light captured by each lens to produce a corresponding image circle on the rectangular image sensor, wherein the image circles produced by the two lenses onto the rectangular image sensor is non-overlapping in area; and a non-reflective separator positioned between the optical pathways of light from the two lenses from the time such light is reflected from the two reflectors respectively, wherein the separator absorbs light from a region surrounding the image circle to prevent optical distortions from the image circles which are in close proximity to each other wherein a focal point of the image circles is within 5 percent of a diagonal line between opposing corners of the image sensor, wherein the outer perimeter of each image circle is within 5 percent of two different edges of the image sensor.

\* \* \* \* \*